United States Patent
Buckley et al.

(10) Patent No.: US 11,057,747 B2
(45) Date of Patent: *Jul. 6, 2021

(54) PROVIDING DATA FILE UPDATES USING MULTIMEDIA BROADCAST MULTICAST SERVICES

(71) Applicant: BlackBerry Limited, Waterloo (CA)

(72) Inventors: Adrian Buckley, Tracy, CA (US); Stephen John Barrett, Haywards Heath (GB); Nicholas James Russell, Newbury (GB)

(73) Assignee: BlackBerry Limited, Waterloo (CA)

( * ) Notice: Subject to any disclaimer, the term of this patent is extended or adjusted under 35 U.S.C. 154(b) by 44 days.

This patent is subject to a terminal disclaimer.

(21) Appl. No.: 16/528,218

(22) Filed: Jul. 31, 2019

(65) Prior Publication Data

US 2020/0045508 A1 Feb. 6, 2020

Related U.S. Application Data

(63) Continuation of application No. 15/619,208, filed on Jun. 9, 2017, now Pat. No. 10,375,530.

(51) Int. Cl.
*H04W 4/06* (2009.01)
*H04W 4/021* (2018.01)
*H04L 29/06* (2006.01)
*H04W 12/37* (2021.01)
*H04W 12/0431* (2021.01)

(52) U.S. Cl.
CPC .......... *H04W 4/06* (2013.01); *H04L 63/0428* (2013.01); *H04W 4/021* (2013.01); *H04W 12/0431* (2021.01); *H04W 12/37* (2021.01)

(58) Field of Classification Search
CPC .......... H04L 63/0428; H04W 12/0027; H04W 12/04031; H04W 4/021; H04W 4/06
See application file for complete search history.

(56) References Cited

U.S. PATENT DOCUMENTS

| 8,578,005 B1 | 11/2013 | Breau et al. |
| 2012/0221739 A1 | 8/2012 | Schroeder, Jr. et al. |
| 2012/0263089 A1 | 10/2012 | Gupta et al. |
| 2014/0227976 A1 | 8/2014 | Callaghan et al. |
| 2017/0150332 A1 | 5/2017 | Palanisamy et al. |

(Continued)

OTHER PUBLICATIONS

3GPP TS 22.179 V14.3.0; 3rd Generation Partnership Project; Technical Specification Group Services and System Aspects; Mission Critical Push to Talk (MCPTT) Over LTE; Stage 1; Release 14; Dec. 2016; 83 pages.

(Continued)

*Primary Examiner* — Zhensheng Zhang
(74) *Attorney, Agent, or Firm* — Conley Rose, P. C.; J. Robert Brown, Jr.

(57) ABSTRACT

A method is provided for providing application data. The method includes a network node receiving at least one application identifier (App-ID) associated with at least a first user equipment (UE) and a second UE; the network node requesting to receive notifications of updates to application data associated with the at least one App-ID; the network node configuring a broadcast entity to transmit application data associated with the at least one App-ID; and the network node sending configuration data to the first and second UEs for receiving application data from the broadcast entity.

20 Claims, 10 Drawing Sheets

(56) References Cited

U.S. PATENT DOCUMENTS

2018/0359612 A1   12/2018   Buckley et al.

OTHER PUBLICATIONS

3GPP TS 22.280 V14.3.0; 3rd Generation Partnership Project; Technical Specification Group Services and System Aspects; Mission Critical Services Common Requirements (MCCoRe); Stage 1; Release 14; Mar. 2017; 87 pages.
3GPP TS 22.281 V14.3.0; 3rd Generation Partnership Project; Technical Specification Group Services and System Aspects; Mission Critical Video Services Over LTE; Release 14; Mar. 2017; 31 pages.
3GPP TS 22.282 V14.2.0; 3rd Generation Partnership Project; Technical Specification Group Services and System Aspects; Mission Critical Data Services Over LTE; Release 14; Dec. 2016; 18 pages.
3GPP TS 23.179 V13.5.0; 3rd Generation Partnership Project; Technical Specification Group Services and System Aspects; Functional Architecture and Information Flows to Support Mission Critical Communication Services; Stage 2; Release 13; Mar. 2017; 229 pages.
3GPP TS 23.246 V12.0.0; 3rd Generation Partnership Project; Technical Specification Group Services and System Aspects; Multimedia Broadcast/Multicast Service (MBMS); Architecture and Functional Description; Release 12; Dec. 2013; 66 pages.
3GPP TS 23.280 V14.1.0; 3rd Generation Partnership Project; Technical Specification Group Services and System Aspects; Common Functional Architecture to Support Mission Critical Services; Stage 2; Release 14; Mar. 2017; 141 pages.
3GPP TS 23.281 V14.1.0; 3rd Generation Partnership Project; Technical Specification Group Services and System Aspects; Functional Architecture and Information Flows to Support Mission Critical Video (MCVideo); Stage 2; Release 14; Mar. 2017; 160 pages.
3GPP TS 23.282 V14.1.0; 3rd Generation Partnership Project; Technical Specification Group Services and System Aspects; Functional Architecture and Information Flows to Support Mission Critical Data (MCData); Stage 2; Release 14; Mar. 2017; 90 pages.
3GPP TS 23.379 V14.1.0; 3rd Generation Partnership Project; Technical Specification Group Services and System Aspects; Functional Architecture and Information Flows to Support Mission Critical Push to Talk (MCPTT); Stage 2; Release 14; Mar. 2017; 186 pages.
3GPP TS 23.271 V14.1.0; 3rd Generation Partnership Project; Technical Specification Group Services and System Aspects; Functional Stage 2 Description of Location Services (LCS); Release 14; Mar. 2017; 183 pages.
3GPP TS 23.468 V14.0.0; 3rd Generation Partnership Project; Technical Specification Group Services and System Aspects; Group Communication System Enablers for LTE (GCSE_LTE); Stage 2; Release 14; Mar. 2017; 30 pages.
3GPP TS 24.229 V14.3.1; 3rd Generation Partnership Project; Technical Specification Group Core Network and Terminals; IP Multimedia Call Control Protocol Based on Session Initiation Protocol (SIP) and Session Description Protocol (SDP); Stage 3; Release 14; Mar. 2017; 979 pages.
3GPP TS 24.379 V14.1.0; 3rd Generation Partnership Project; Technical Specification Group Core Network and Terminals; Mission Critical Push to Talk (MCPTT) Call Control; Protocol Specification; Release 14; Mar. 2017; 498 pages.
3GPP TS 26.346 V14.2.0; 3rd Generation Partnership Project; Technical Specification Group Services and System Aspects; Multimedia Broadcast/Multicast Service (MBMS); Protocols and Codecs; Release 14; Mar. 2017; 260 pages.
3GPP TS 33.220 V14.0.0; 3rd Generation Partnership Project; Technical Specification Group Services and System Aspects; Generic Authentication Architecture (GAA); Generic Bootstrapping Architecture (GBA); Release 14; Dec. 2016; 93 pages.
3GPP TS 33.246 V13.1.0; 3rd Generation Partnership Project; Technical Specification Group Services and System Aspects; 3G Security; Security of Multimedia Broadcast/Multicast Service (MBMS); Release 13; Dec. 2015; 74 pages.
3GPP TS 36.300 V12.3.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 12; Sep. 2014; 215 pages.
Freed, J., et al.; "Multipurpose Internet Mail Extensions (MIME) Part Two: Media Types"; RFC 2046; Nov. 1996; 38 pages.
Rosenberg, J., et al.; "SIP: Session Initiation Protocol"; RFC 3261; Jun. 2002; 269 pages.
Campbell, B., et al.; "Session Initiation Protocol (SIP) Extension for Instant Messaging"; RFC 3428; Dec. 2002; 16 pages.
Rosenberg, J., et al.; "Caller Preferences for the Session Initiation Protocol (SIP)"; RFC 3841; Aug. 2004; 26 pages.
Niiemi, A.; "Session Initiation Protocol (SIP) Extension for Event State Publication"; RFC 3903; Oct. 2004; 28 pages.
Kaufman, C., et al.; "Internet Key Exchange Protocol Version 2 (IKEv2)"; RFC 5996; Sep. 2010; 119 pages.
Drage, K.; "A Session Initiation Protocol (SIP) Extension for the Identification of Services"; RFC 6050; Nov. 2010; 19 pages.
Jones, M., et al.; "JSON Web Token (JWT)"; RFC 7519; May 2015; 30 pages.
Dodd-Noble, A., et al.; "3GPP IP Multimedia Subsystems (IMS) Option for the Internet Key Exchange Protocol Version 2 (IKEv2)"; RFC 7651; Sep. 2015; 10 pages.
Open Mobile Alliance; "Mobile Broadcast Services Architecture"; Approved Version 1.1; OMA-AD-BCAST-V1_1-20131029-A; Oct. 29, 2013; 128 pages.
Open Mobile Alliance; "OMA Device Management Server Delegation Protocol"; Candidate Version 1.3; OMA-TS-DM_Sever_Delegation_Protocol-V1_3-20121009-C; Oct. 9, 2012; 33 pages.
Open Mobile Alliance; "OMA Device Management Protocol"; Candidate Version 1.3; OMA-TS-DM_Protocol-V1_3-20121009-C; Oct. 9, 2012; 60 pages.
Open Mobile Alliance; "Firmware Update Management Object"; Approved Version 1.0.2; OMA-TS-DM-FUMO-V1_0_2-20090828-A; Aug. 28, 2009; 31 pages.
Open Mobile Alliance; "Software Component Management Object (SCOMO)"; Approved Version 1.1; OMA-ER-SCOMO-V1_1-20130521-A; May 21, 2013; 71 pages.
Open Mobile Alliance; "Enabler Release Definition for OMA Device Management"; Approved Version 1.2; OMA-ERELD-DM-V1_2-20070209-A; Feb. 9, 2007; 14 pages.
Open Mobile Alliance; "Enabler Release Definition for OMA Device Management"; Approved Version 1.3; OMA-ERELD-DM-V1_3-20160524-A; May 24, 2016; 16 pages.
Open Mobile Alliance; "Lightweight Machine to Machine Technical Specification"; Candidate Version 1.0; OMA-TS-LightweightM2M-V1_0-20151214-C; Dec. 14, 2015; 126 pages.
Office Action dated Jan. 17, 2019; U.S. Appl. No. 15/619,208, filed Jun. 9, 2017; 21 pages.
Notice of Allowance dated Apr. 17, 2019; U.S. Appl. No. 15/619,208, filed Jun. 9, 2017; 8 pages.
PCT International Search Report; Application No. PCT/US2018/030940; dated Jul. 12, 2018; 3 pages.
PCT Written Opinion of the International Searching Authority; Application No. PCT/US2018/030940; dated Jul. 12, 2018; 3 pages.
European Extended Search Report; Application No. 18813943.0; dated Sep. 25, 2020; 10 pages.

In the SIP PUBLISH request, the UE:

1) shall set the Request-URI to the public service identity identifying the content manager serving the UE;

2) shall include an Accept-Contact header field containing the g.3gpp.download media feature tag along with the "require" and "explicit" header field parameters according to IETF RFC 3841 [6];

3) shall include the ICSI value "urn:urn-7:3gpp-service.ims.icsi.download" (coded as specified in 3GPP TS 24.229 [4]), in a P-Preferred-Service header field according to IETF RFC 6050 [9];

4) if the UE is interested in at least one App-ID, shall set the Expires header field according to IETF RFC 3903 [37], to 4294967295;

NOTE: 4294967295, which is equal to $2^{32}-1$, is the highest value defined for Expires header field in IETF RFC 3261 [24].

5) if the UE is no longer interested in any App-ID, shall set the Expires header field according to IETF RFC 3903 [37], to zero; and NOTE – 5 IS AN ALTERNATIVE IMPLEMENATION TO THE XML STATUS FIELD IN TABLE X.Y.Z-1

6) shall include an application/pidf+xml MIME body indicating per-user affiliation information according to subclause X.Y.Z.

The UE send the SIP PUBLISH request according to 3GPP TS 24.229 [4].

Subclause X.Y.Z

Table X.Y.Z-1: XML schema with elements and attributes extending the application/pidf+xml MIME body

```xml
<?xml version="1.0" encoding="UTF-8"?>
<xs:schema
  targetNamespace="urn:3gpp:ns:downloadInfo:1.0"
  xmlns:xs="http://www.w3.org/2001/XMLSchema"
  xmlns:download="urn:3gpp:ns:downloadInfo:1.0"
  elementFormDefault="qualified" attributeFormDefault="unqualified">

<!-- download specific child elements of tuple element -->
  <xs:element name="update" type="download:updateType"/>
  <xs:complexType name="updateType">
    <xs:sequence>
      <xs:any namespace="##any" processContents="lax" minOccurs="0" maxOccurs="unbounded"/>
    </xs:sequence>
    <xs:attribute name="App-ID" type="xs:anyURI" use="optional"/>
    <xs:attribute name="client" type="xs:anyURI" use="optional"/>
    <xs:attribute name="status" type="download:statusType" use="optional"/>
    <xs:attribute name="expires" type="xs:dateTime" use="optional"/>
    <xs:anyAttribute namespace="##any" processContents="lax"/>
  </xs:complexType>

<xs:simpleType name="statusType" >
    <xs:restriction base="xs:string">
      <xs:enumeration value="updaterequired"/>
      <xs:enumeration value="updatenotrequired"/>
      <xs:enumeration value="Applicationdelated"/>
    </xs:restriction>
  </xs:simpleType>

</xs:schema>
```

......

6) contains a "App-ID" attribute of each <update> element set to the App-ID in which the UE is interested;

7) can contain a "status" attribute of each <update> element indicating the update status of the App-ID the UE is interested in; and 6) contains one "client" attribute, of the <update> element set to the Public User identity that is associated with the App-ID e.g. could be an email address.

FIG. 4

1. When the ~~GCS-AS~~ <u>CONTENT MANAGER</u> wishes to activate an MBMS bearer over MB2, the ~~GCS-AS~~ <u>CONTENT MANAGER</u> sends an Activate MBMS Bearer Request message to the BM-SC, including the TMGI which represents the MBMS bearer to be started, QoS, MBMS broadcast area, and start time. The TMGI is optional. The QoS shall be mapped into appropriate QoS parameters of the MBMS bearer. The MBMS broadcast area parameter shall include a list of MBMS Service Area Identities, or a list of cell IDs, or both.

NOTE 1: If the MBMS broadcast area parameter includes a list of MBMS Service Area Identities, the list of MBMS Service Area Identities is determined from information that ~~may come from the UEs (e.g. list of cell IDs) or some other knowledge of where to establish the service (e.g. configuration)~~ <u>was obtained in step 8</u>.

2. If the TMGI was included, the BM-SC shall determine whether the ~~GCS-AS~~ <u>CONTENT MANAGER</u> is authorized to use the TMGI. The BM-SC shall reject the request if the TMGI is not authorized. If the TMGI was not included in the request, the BM-SC shall assign an unused value for the TMGI. The BM-SC allocates a FlowID value corresponding to this TMGI and MBMS broadcast area. If the MBMS broadcast area parameter includes a list of cell IDs, the BM-SC may map the cell IDs into MBMS Service Area Identities subject to operator policy. The BM-SC shall then include a list of MBMS Service Area Identities and, if available, the list of cell IDs in the MBMS Session Start message. If another MBMS bearer with the same TMGI is already activated, the BM-SC shall accept the request only if the MBMS broadcast area in the new request is not partly or completely overlapping with any existing MBMS bearer(s) using the same TMGI as according to TS 23.246 [3] and shall allocate a unique FlowID for the newly requested MBMS bearer. The BM-SC shall allocate MBMS resources to support content delivery of the MBMS bearer to the requested MBMS broadcast area using the Session Start procedure defined in TS 23.246 [3].

3. The BM-SC shall send an Activate MBMS Bearer Response message to the ~~GCS-AS~~ <u>CONTENT MANAGER</u>, including the TMGI, the allocated FlowID, service description, BM-SC IP address and port number for the user-plane, and an expiration time. The service description contains MBMS bearer related configuration information as defined in TS 26.346 [7] (e.g. radio frequency and MBMS Service Area Identities). If the BM-SC mapped the cell IDs into the MBMS Service Area Identities in Step 2, then the service description shall contain the MBMS Service Area Identities that the BM-SC included in the MBMS Session Start message. The expiration time is included only if the BM-SC has allocated a TMGI as a result of this procedure.

FIG. 5

For each ~~MCPTT client~~ UE that the ~~participating MCPTT function~~ content manager is sending an MBMS bearer announcement to, the ~~participating MCPTT function~~ content manager:

1) shall generate an SIP MESSAGE request in accordance with 3GPP TS 24.229 [4] and IETF RFC 3428 [33];

2) shall set the Request-URI to the public service identity identifying the ~~participating MCPTT function~~ content manager serving the ~~MCPTT client~~ UE;

3) shall include an Accept-Contact header field containing the g.3gpp.download media feature tag along with the "require" and "explicit" header field parameters according to IETF RFC 3841 [6];

4) shall include an Accept-Contact header field with the g.3gpp.icsi-ref media-feature tag with the value of "urn:urn-7:3gpp-service.ims.icsi.download " along with parameters "require" and "explicit" according to IETF RFC 3841 [6];

5) shall include a P-Asserted-Service header field with the value "urn:urn-7:3gpp-service.ims.icsi.download ";

6) shall include the Content-Type header field with the value "multipart/mixed" as specified in IETF RFC 2046 [21];

7) shall include one "application/sdp" MIME body conforming to 3GPP TS 24.229 [4] where the "application/sdp" MIME body and:

a) shall include the Content-Type header field set to "application/sdp";

b) shall include the Content-Disposition header field with the value "render"; and e) shall include one "m=application" media line to be used as the datadownload MBMS subchannel. The media line shall include a valid IP address and a valid port number; and 8) shall include one or more <announcement> elements associated with the pre-activated MBMS bearers in the "application/vnd.3gpp.download-mbms-usage-info+xml" MIME body as defined in clause X. Each set of an <announcement> element:

a) shall include a TMGI value in the <TMGI> element;

NOTE 4: The same TMGI value can only appear in one <announcement> element. The TMGI value is also used to identify the <announcement> when updating or cancelling the <announcement> element.

<u>b) shall include the Flow id in the <flow-id> element, if known;</u> c) shall include the MBSFN area id in the <MBSFN-area-id> element, if known;

d) shall include the QCI value in the <QCI> element if known;

e) if multiple carriers are supported, shall include the frequency to be used in the <frequency> element;

NOTE 5: In the current release if the <frequency> element is included, the frequency in the <frequency> element is the same as the frequency used for unicast.

f) shall include one or more MBMS service area in the <mbms-service-area> elements;

<u>g) optionally include the encryption algorithm to be used in the <encryption-algorithm> element;</u>

<u>h) optionally include the encryption key to be used in the <encryption-key> element</u>

<u>i) optionally include App-ID(s) in the <app-id> element and</u>

10) shall include the MBMS public service identity of the content manager in the P-Asserted-Identity header field;

11) shall send the SIP MESSAGE request towards the ~~MCPTT client~~ UE according to 3GPP TS 24.229 [4]

FIG. 6

PROVIDING DATA FILE UPDATES USING MULTIMEDIA BROADCAST MULTICAST SERVICES

CROSS-REFERENCE TO RELATED APPLICATIONS

This application is a continuation of U.S. patent application Ser. No. 15/619,208 filed Jun. 9, 2017 by Adrian Buckley, et al. entitled, "Providing Data File Updates Using Multimedia Broadcast Multicast Services", which is incorporated by reference herein as if reproduced in its entirety.

BACKGROUND

As telecommunications technology has evolved, more advanced network access equipment has been introduced that can provide services that were not possible previously. This network access equipment might include systems and devices that are improvements of the equivalent equipment in a traditional wireless telecommunications system. Such advanced network access equipment may be included in evolving wireless communications standards, such as long-term evolution (LTE), LTE Advanced (LTE-A), 5G, etc. For example, in an LTE system the advanced network access equipment might include an Evolved Universal Terrestrial Radio Access Network (E-UTRAN) node B (eNB). In various wireless communications systems, the advanced network access equipment may include a base station, a wireless access point, or a similar component operable as an access node according to a corresponding wireless communications standard. Any such component will be referred to herein as an eNB, but it should be understood that such a component is not necessarily an eNB. Such a component may also be referred to herein as an access node or base station.

As used herein, the term "user equipment" (UE) can refer to mobile devices such as mobile telephones, personal digital assistants, handheld or laptop computers, and similar devices that have telecommunications capabilities. Such a UE might comprise a wireless device (also known as a Mobile Equipment (ME)) and its associated Universal Integrated Circuit Card (UICC) that includes a Subscriber Identity Module (SIM) application, a Universal Subscriber Identity Module (USIM) application, or a Removable User Identity Module (R-UIM) application or might comprise the device itself without such a card. The term "UE" may also refer to devices that have similar capabilities but that are not transportable, such as fixed line telephones, desktop computers, or set-top boxes. The term "UE" can also refer to any hardware, firmware, or software component that can terminate a Session Internet Protocol (SIP) session.

Services that might be provided by LTE-based equipment can include broadcasts or multicasts of television programs, streaming video, streaming audio, streaming data and other multimedia content. One such service is referred to as multimedia broadcast multicast services, which is specified by the Third Generation Partnership Project (3GPP) as MBMS. However, it is to be understood that as used herein, the term "MBMS" may refer more broadly to any suitable type of broadcast and/or multicast services (i.e., not necessarily to those specified by 3GPP). A broadcast or multicast service might be transmitted throughout a single cell or throughout several contiguous or overlapping cells. A set of cells receiving a broadcast or multicast service can be referred to as a service area. A service area and a region under the control of a central control entity do not necessarily coincide. For example, a central control entity might specify that a first subset of cells under its control will deliver a first MBMS and that a second subset of cells under its control will deliver a second MBMS.

When multiple cells overlap, a UE within the overlapped region can receive transmissions from multiple eNBs. Moreover, when a UE receives substantially identical data from a plurality of eNBs, the transmissions from the eNBs can augment one another to provide a signal of significantly higher quality than would be the case if only one eNB were transmitting the signal. That is, a higher signal-to-noise ratio can be achieved when substantially the same data is transmitted at substantially the same time on substantially the same resource with substantially the same modulation and coding. A region in which a plurality of substantially identical signals are present is known as a single frequency network, or SFN. In the case where all of the eNBs in a service area are transmitting an MBMS with substantially identical signals, the service area can be referred to as a multicast/broadcast single-frequency network (MBSFN).

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 illustrates an example implementation of a SIP Publish message according to an embodiment of the disclosure.

FIG. 5 illustrates an example implementation of an Activate MBMS Bearer procedure according to an embodiment of the disclosure.

FIG. 6 illustrates an example implementation of an MBMS Bearer Announcement procedure according to an embodiment of the disclosure

DETAILED DESCRIPTION

Figure 1:
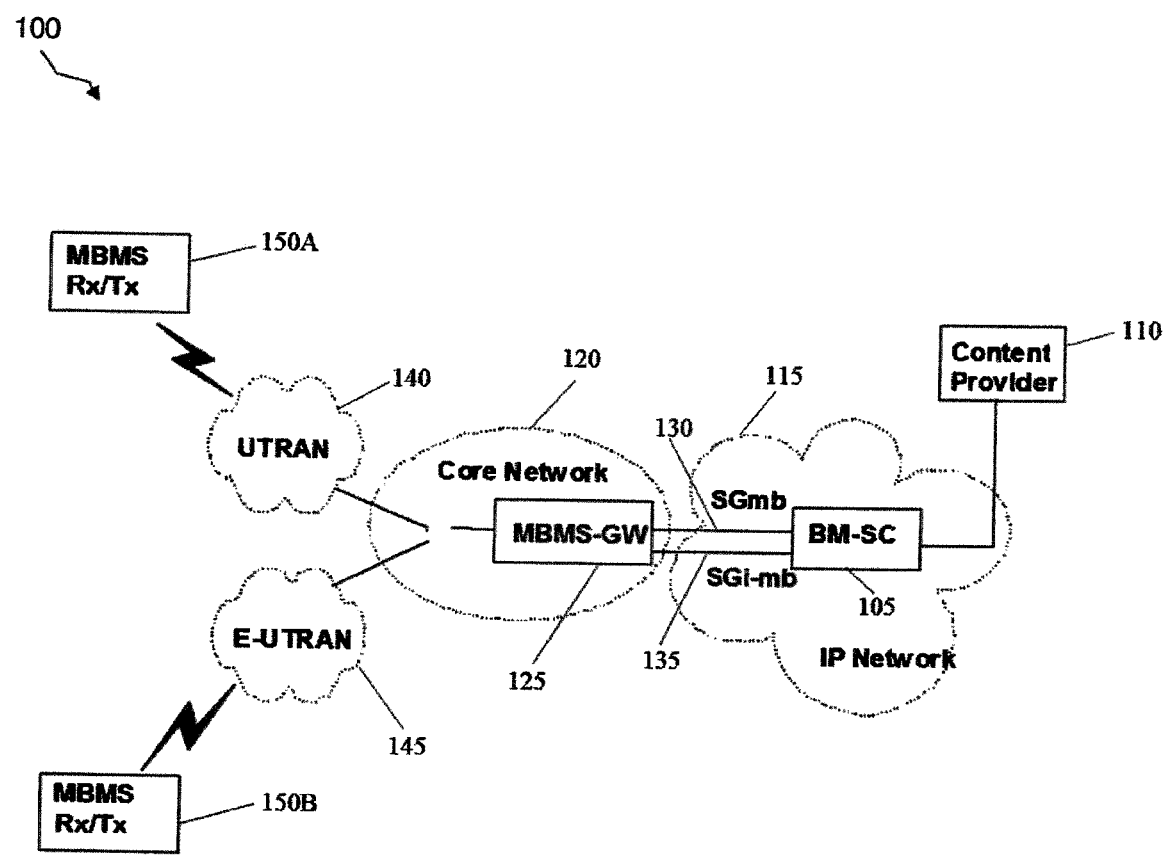
FIG. 1 is an example diagram of a network architecture according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used throughout the specification, claims, and figures, the acronyms below have the following definitions. Unless stated otherwise, all terms are defined by and follow the standards set forth by the Third Generation Partnership Program (3GPP) technical specifications or by the OMA (Open Mobile Alliance).

3GPP 3rd Generation Partnership Project
AP Access Point
AS Application Server
BM-SC Broadcast-Multicast Service Centre (a server performing MBMS delivery methods)
BSC Base Station Controller
BTS Base Transceiver Station
CBC Cell Broadcast Centre
CBE Cell Broadcast Entity
CBM Cell Broadcast Message
CBS Cell Broadcast Service
CSCF Call/Session Control Function
DM Device Management (the action of managing a device remotely)
DTLS Datagram Transport Layer Security
ePDG Evolved Packet Data Gateway
E-UTRAN Evolved Universal Terrestrial Access Network
GERAN GPRS EDGE Radio Access Network (RAN)
GGSN Gateway GPRS Support Node
GMLC Gateway Mobile Location Centre
GPRS General Packet Radio Service
GRUU Globally Routable User Agent URI
GSM Global System for Mobile telecommunication
HLR Home Location Register
HSS Home Subscriber Server
HTTP Hypertext Transfer Protocol (an application protocol for distributed, collaborative, hypermedia information systems. HTTP is the foundation of data communication for the World Wide Web. Hypertext is structured text that uses logical links (hyperlinks) between nodes comprising text).
HTTPs HTTP Secure (HTTPS consists of communication over Hypertext Transfer Protocol within a connection encrypted by Transport Layer Security or its predecessor, Secure Sockets Layer).
IBCF Interconnection Border Control Function
I-CSCF Interrogating CSCF
IKE Internet Key Exchange
IMEI International Mobile Equipment Identity
IMS IP Multimedia Subsystem
IP Internet Protocol
ISIM IP Multimedia Services Identity Module
ITS Intelligent Transport Systems
ITS-AID ITS Application Identifier
ISDN Integrated Services Digital Network
LCS Location Services
LTE Long Term Evolution
MAC Media Access Control
MBMS Multimedia Broadcast Multicast Service
MC Mission Critical
MCData Mission Critical Data
MCPTT Mission Critical Push-To-Talk
MCVideo Mission Critical Video
MCS Modulation and Coding Scheme
ME Mobile Equipment
MIME Multi-Purpose Internet Mail Extensions
MME Mobile Management Entity
MO Management Object
MSC Mobile Switching Centre
MSISDN Mobile Station ISDN
PDN-GW Packet Data Network (PDN) Gateway
P-GW Packet Gateway
PLMN Public Land Mobile Network
PRB Physical Resource Block
P-CSCF Proxy CSCF
PSCCH Physical Sidelink Control Channel
PSSCH Physical Sidelink Shared Channel
RNC Radio Network Controller
RRC Radio Resource Control
RSU Radio Side Unit
SBC Session Border Controller
SCEF Service Capability Exposure Function
S-CSCF Serving CSCF
SCI Sidelink Control Information
S-GW Serving Gateway
SGSN Serving GPRS Support Node
SIB System Information Block
SIP Session Initiation Protocol
TMGI Temporary Mobile Group Identity
TS Technical Specification
UE User Equipment (end device, e.g., smartphone, Internet of things (IoT) device, etc. In the context of the present disclosure, the UE may simply include a mobile equipment or mobile equipment and UICC)
UICC Universal Integrated Circuit Card (comprises secret key for authentication purposes, plus other subscription related data, e.g., identities)
URI Uniform Resource Identifier (see URL (infra); a URI further comprises a URN)
URN Uniform Resource Name
URL Uniform Resource Locator (address of an Internet resource such as a website or application server or other resource)
USD User Service Description (details of an MBMS service that allows a user equipment or application to choose to tune in/obtain)
USIM Universal Subscriber Identity Module
UTRAN UMTS Terrestrial Radio Access Network
V2X Vehicle-to-Everything
XML Extendible Markup Language I. Multimedia Broadcast Multicast Service (MBMS)

MBMS is a 3GPP broadcast technology similar to CBS, but MBMS allows an operator to deliver more data intensive content (e.g., video) to a group of recipients. MBMS is supported by GERAN, UTRAN and E-UTRAN. MBMS over E-UTRAN is referred to as E-MBMS, which is described in 3GPP TS 36.300. MBMS supports two basic basic transmission modes for delivering IP packets: broadcast and multicast.

The broadcast mode is a unidirectional point-to-multipoint transmission of multimedia data (e.g. text, audio, picture, video) and can be used to deliver IP packets to all terminals in a certain area or a whole network. If the broadcast mode is used, a transmission bearer is set up for all cells in which the service should be available and is continuously transmitting as long as the service is up and running. In broadcast mode, MBMS does not require an uplink connection and can thus be used like other "downlink-only" broadcast technologies such as Digital Video Broadcasting-Handheld (DVB-H) and Digital multimedia broadcasting (DMB). Data that is broadcast may be encrypted, e.g., for pay television and subscription-based television services.

The multicast mode operates similar to IP multicasting and allows the unidirectional point-to-multipoint transmission of multimedia data (e.g. text, audio, picture, video) from a single source point to a multicast group. For example, a terminal that wants to receive information related to particular multicast channels "joins" one or more content channels, i.e., the terminal expresses interest in receiving content associated with the joined channel(s). This information is processed in the routing layer of a core network and is used for optimizing the data delivery path such that over connections shared by receivers of the same multicast channels, data is transmitted just once.

One drawback of multicasting is that additional delay may be incurred when switching from one channel to another. Therefore, MBMS multicasting is less suitable for mobile TV services, which usually require a low TV channel switching delay. MBMS multicasting is mainly applied for downloading data or podcast services. MBMS services may be made available to all devices capable of receiving MBMS services, or to one or more sub-groups of such devices. In the latter case, MBMS content may be encrypted.

FIG. 1 depicts an example block diagram of an MBMS network architecture 100 comprising a BM-SC 105 interfaced with a content provider 110. The content provider 110 may comprise any entity configured to provide content and services such as, but not limited to, an application service provider (ASP), network service provider, (NSP), Internet Service Provider (ISP), Managed Service Provider (MSP), Storage Service Provider (SSP), Telecommunications Service Provider (TSP), Security Assertion Markup Language (SAML) Service Provider (SSP), Online Service Provider (OSP), Payment Service Provider (PSP), and the like.

While only one content provider 110 is depicted in FIG. 1, it is to be understood that the BM-SC 105 may be configured to interface with a plurality of different content providers. The architecture 100 may comprise an IP network 115 and a core network 120. The core network 120 may include an MBMS gateway (MBMS-GW) 125 coupled to the BM-SC 105 via one or more interfaces such SGmb 130 and SGi-mb 135. SGmb 130 is a reference point for a control plane between the BM-SC 105 and the MBMS-GW 125, while SGi-mb 135 is a reference point between BM-SC 105 and the MBMS-GW 125 for MBMS data delivery. In other implementations, the core network 120 may include additional and/or alternative nodes such as, but not limited to a GGSN, an MME, an S-GW, an SGSN/MSC, a P-GW, an ePDG, an HSS/HLR, a P-CSCF, an I-CSCF, an S-CSCF, an HSS, an AS, an SBC/IBCF, and the like.

The MBMS-GW 125 is configured to receive MBMS traffic from the BM-SC 105 and forward the received MBMS traffic to one or more network nodes (not shown) located in access networks such as UTRAN 140, E-UTRAN 145, GERAN (not shown), and the like. Examples of network nodes include, but are not limited to, a NodeB, an eNodeB (eNB), a BTS, a BSC, an RNC, an access point, and the like. The network nodes deployed in UTRAN 140 and E-UTRAN 145 are configured to transmit MBMS data over an air interface to UE 150A and UE 150B, respectively, each of which may comprise an MBMS transceiver (Rx/Tx) for receiving/transmitting data associated with the MBMS service.

Figure 2:
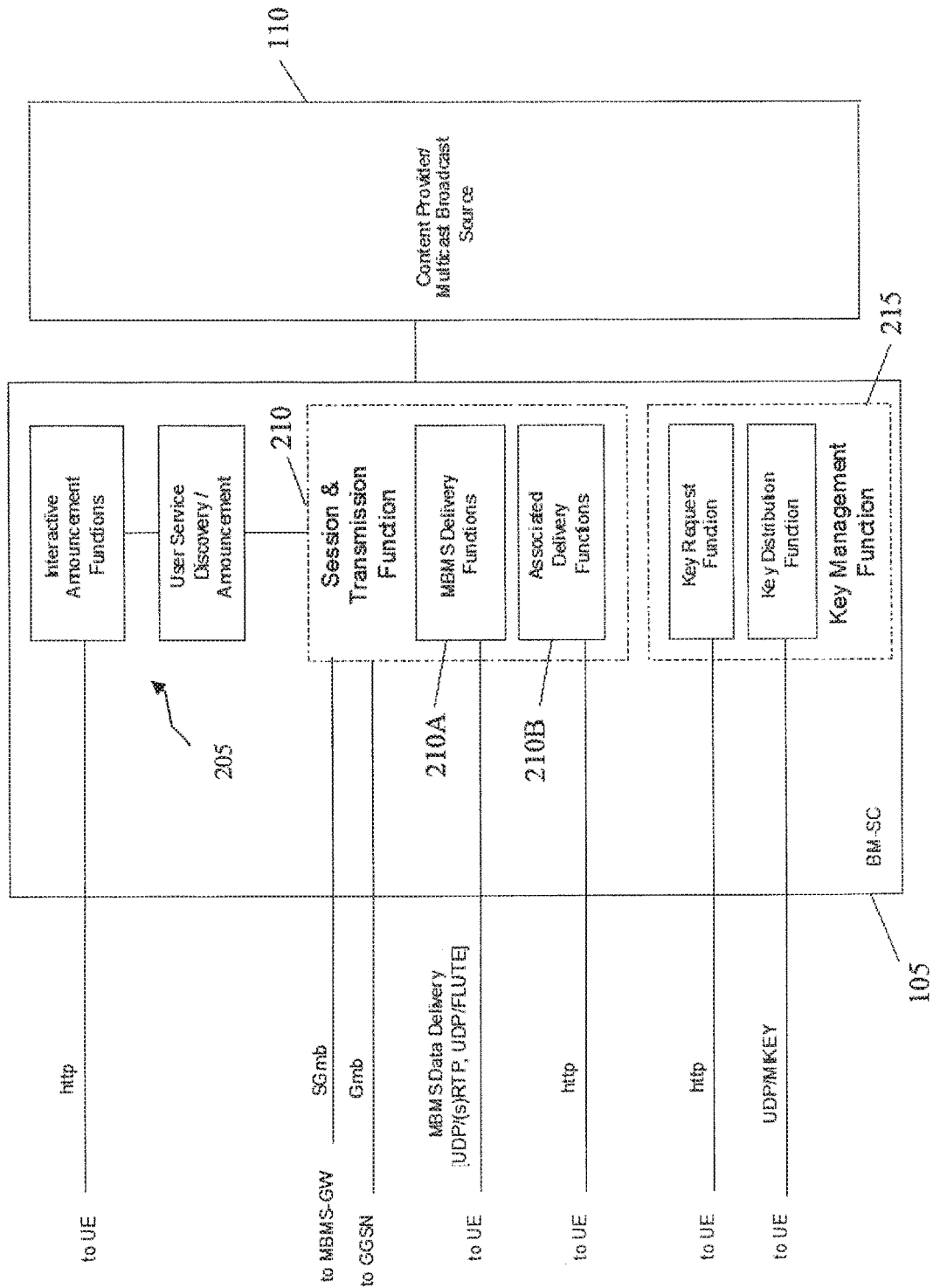
FIG. 2 is an example diagram of a Broadcast-Multicast Service Centre (BM-SC) according to an embodiment of the disclosure.

FIG. 2 depicts an example diagram of functional and structural features of the BM-SC 105. The functions of the BM-SC 105 are well known to those of ordinary skill in the art, and therefore, discussion of these functions will be limited for brevity. In order for a user equipment (e.g., UE 150A or 150B) to discover and/or tune into an MBMS service, the UE has to be provided configuration information/data and service announcement information. To this end, the BM-SC 105 may use Interactive Announcement and User Service Discovery/Announcement Functions 205 to provide service announcements to end-devices (e.g., UEs 150A and 150B) over HTTP bearers. 3GPP TS 23.246 identifies additional details regarding various mechanisms that the BM-SC 105 may use for MBMS service announcements.

The BM-SC 105 may also use Session and Transmission Functions 210 to provide data transmission related functions including data encryption. The Session and Transmission Function 210 may be subdivided into MBMS Delivery and Associated Delivery Functions 210A and 210B. The MBMS Delivery Function 210A may deliver files via MBMS Download services or streams via MBMS Streaming service, while the Associated Delivery Function 210B may add auxiliary procedures such as file repair or reception reporting. The BM-SC 105 may further use an MBMS Key Management Function 215 to provide authorized terminals (e.g., terminals subscribed to a particular MBMS service) with the necessary keys to decrypt multimedia files, MBMS data streams, etc.

II. MBMS Encryption and Digital Rights Management (DRM) for MBMS

MBMS encryption is described in 3GPP TS 33.246. The basic keying mechanism used for MBMS encryption is based upon Generic Bootstrapping Architecture (GBA), which is described in 3GPP TS 33.220.

The purpose of DRM is to prevent unauthorized redistribution of digital media and restrict the ways consumers can copy purchased content. An architecture for DRM for MBMS has been developed by OMA and is specified in OMA-AD-BCAST-V1_1-20131029-A. One component of this architecture is the smartcard. For 3GPP based systems, the generation of keys is based upon GBA.

III. Mission Critical Services

In 3GPP, multiple 3GPP Mission Critical (MC) services are defined e.g. Mission Critical Push-To-Talk (MCPTT), Mission Critical Video (MCVideo), Mission Critical Data (MCData), etc. MC services are a 3GPP global initiative to support such functionality as push to talk functionality (MCPTT e.g. a "walkie-talkie" like service), video sharing and access to videos stored in the network (MCVideo), and for MCData the sending/receiving Short Data Service messaging (SDS) and File Delivery (FD). Currently, MC services are defined to run over LTE networks, and are for organisations such as government agencies (e.g., security, police, fire and rescue services) as well as commercial organisations such as utility and transportation companies. MC service signalling (e.g. call signalling, session signalling, message signalling, file transfer signalling, streaming signalling, etc) is based on a SIP based core network, which may but need not be a 3GPP IMS core network. MC service servers (e.g. MCPTT Server, MCVideo Server, MCData Server, etc) typically handle most of the MC service signalling and the MC service logic. A location management server receives and stores user location data/information, provides user location information to MC service servers, and may acquire location information provided by PLMN operators. In some deployment scenarios, commercial PLMN operators may operate the IMS SIP core network for a Public Safety agency's MC service while the MC service application layer MC service Server (which could be an MCPTT Server, an MCVideo Server, an MCData Server, location management server, etc) and other application layer network entities may either be operated by the Public Safety agency or a Public Safety Service provider such as the USA First Responders Network Authority (FirstNet). Some Public Safety communications are considered highly sensitive not only in terms of the actual media communication (e.g., voice, video, messaging, data stream, files, etc), but also in terms of the identities of the parties involved in a call and the nature of that call.

As previously mentioned, MBMS provides a mechanism to broadcast data to users, or deliver content to users via point-to-point (P2P). The mechanism is such that users (e.g., UEs 150A and 150B) register their interest in data, which is then delivered to the users at that point in time. A network entity (e.g., BM-SC 105) may decide if a broadcast or P2P mechanism should be used to deliver the data to the users. MBMS generally uses efficient radio resources (e.g., bandwidth) to deliver data from a single source entity to multiple users. However, significant resources may be wasted when many user subscribers start downloading a large amount of identical data (e.g., podcasts, video clips, application updates, etc.) in a P2P arrangement e.g., where users are spread out geographically. Such depletion of resources may even risk denial of service/reduced throughput to other subscribers or of services used by an operator's subscribers.

Existing MBMS announcement mechanisms do not define the details needed for scenarios where the content to be conveyed may be a firmware or software update. One solution might involve extending the DM Client Management Object (MO) to include the uniform resource locator (URL) of the MBMS server where it is to receive updates from an MBMS Server instead of from a DM Server. However, there may be at least a few limitations with this solution. For example, a device interested in receiving the update may not be within the MBMS coverage area. Alternatively, the device may be within the appropriate MBMS coverage area, but not at the relevant time in which the update is to be delivered.

Moreover, while MBMS provides broadcast and multicast services along with a discovery mechanism that can be interactive, an interface to a variety of clients has yet to be defined. In addition, existing MBMS mechanisms do not specify configuration of MBMS services or of applications via DM over MBMS. Further, while MBMS security DRM for MBMS is based upon GBA, there are few, if any, known deployments of GBA. There is currently little to no interest in using GBA, as GBA is considered a cost prohibitive solution from the operator community standpoint (e.g., the price per subscriber is relatively costly). GBA may be considered an option for technologies such as OMA Secure User Plane Location (SUPL), but deployments of that technology have used other mechanisms than GBA.

Embodiments of the present disclosure provide solutions to efficiently deliver content when there are a sufficient number of users in a service area that are interested in content. In cases where such content is not time sensitive, a broadcast mechanism may be used to deliver the content to those users rather than using a P2P mechanism. For example, assume there is a new software update for an Engine Management Unit (EMU) or Engine Control Unit (ECU) of a plurality of cars of the same model/configuration, each car belonging to a different user. If the new software update is not time-critical, a broadcast mechanism may be used to deliver such data when there are a sufficient number of those cars in a geographical area. As another example, assume there are a number of MC-service users (e.g., firemen) interested in a common file (e.g., description of a building on fire or a map with directions to the building), the file may be delivered to those MC service users via a broadcast mechanism rather than a P2P mechanism. Embodiments of the present disclosure further provide a solution for securely broadcasting content to users.

The following discussion provides additional details regarding the embodiments described above. For the purpose of clarity, it is to be understood that any one of the embodiments disclosed herein (or one or more aspects thereof) may be combined with any one or more of the other embodiments disclosed herein (or one or more aspects thereof) to provide a new embodiment within the scope of the present disclosure.

III. Content Delivery via MBMS

As used in the following description, claims, and/or figures, the terms below have the following definitions.

| | |
|---|---|
| Area Identifier | Temporary Mobile Group Identity (TMGI) |
| App-ID | An identifier that may indicate a specific application, a software load, a file, file type, or video type. See also Data Store (infra). |
| Content Manager | Also known as Content Provider. May comprise a Network Node 2 (infra), an MCPTT Server, Group Communication Service (GCS) server, MCVideo Server, MCData Server, location management server, etc. This function manages requests from User identities for App-IDs for which the User identities would like to receive data. The content manager requests location information for those user identities, the state of the data associated with the App-ID, and when the data is ready to be delivered and there are sufficient user identities in a geographical area, the content manager requests a broadcast entity (e.g., BM-SC) to deliver that data. |
| Device ID | Examples include, but are not necessarily limited to, an IMEI, a MAC address, a personal identification number (PIN), etc. This ID could also be wild carded. |
| Data | May include any type of data, such as, but not limited to, control data, media data, user data, metadata, application data, configuration data, etc. |
| Data Store | This may include Network Node 1 and/or a server that comprises data (e.g., files, applications, firmware updates, etc.). Data Store may be combined with the Content Manager. In the context of MC service data, Data Store may comprise the MCData Server. Data Store comprises zero to number N of data items (N is a positive integer greater than one), each data item having a corresponding Application ID. |

| | |
|---|---|
| Download Session Announcement | An MBMS session announcement specific to the delivery of a file in download (by opposition to streaming). |
| Encryption Information | Examples include, but are not limited to, keys, certificates, etc. |
| Identity | May comprise a Public identity (ID), a Public User ID, a Private ID, a Private user ID, an identity of a device, or any combination(s) thereof. The identity may be wild carded. |
| LCS | An entity configured to provide location information. May comprise an SCEF that obtains location information from an entity called LCS. |
| Network | One or N number of network nodes, e.g., Network Node 1, Network 2, . . . , Network Node N (N is a positive integer greater than one). Network nodes may be implemented as a single node or a collection of nodes. |
| Public User ID | Examples include, but are not limited to, an MSISDN, email address, SIP URI, Tel URI, etc. The property of this identity is that it is known to the public. May also be known as a Public User Identity. |
| Private User ID | Examples include, but are not limited to, an IMSI, SIP URI, etc. The property of this identity is that it is only known to the network and device. May also be known as a Private User Identity or Private ID. |
| User Identity | May comprise the Public User ID and/or Private User ID. This identity may be wild carded. |
| UE | A device that communicates wirelessly or using a fixed communication (e.g., Ethernet or the like). This device may or may not comprise a UICC. May also be known as a device. |
| UICC | UICC information may be located either on a removal module or in internal memory. UICC comprises applications or profiles that are used by the UE. |
| Wild Carded | Denotes that a given identity comprises one or more alphanumeric characters implying that one or more respective character spaces may comprise any alphanumeric character. Also denotes that the length of a given identity is less than traditionally associated with that identity (e.g., implies that the remainder of that identity may comprise anything). Further, a wild carded identity may comply with other now known or later developed wild card mechanisms. |

It is to be understood that when an indicator is received by an element in one message and subsequently used in another message, the indicator used in the subsequent message may be modified by the element. As a non-limiting example, assume a UE receives a user identity such as an international mobile subscriber identity (IMSI) in the format of "1234567890," the UE may send that user identity in a modified format such as "1234567890@domain.com".

Among other things, the following solutions describe a concept where a "content manager" receives notifications from devices that are interested in receiving specific data (referred herein as Application IDs or App-IDs). The content manager may then determine an efficient way to download such data when a sufficient number of devices have registered an interest in a particular application and are located in a geographical area that allows MBMS to be used for delivering that data.

Figure 3:
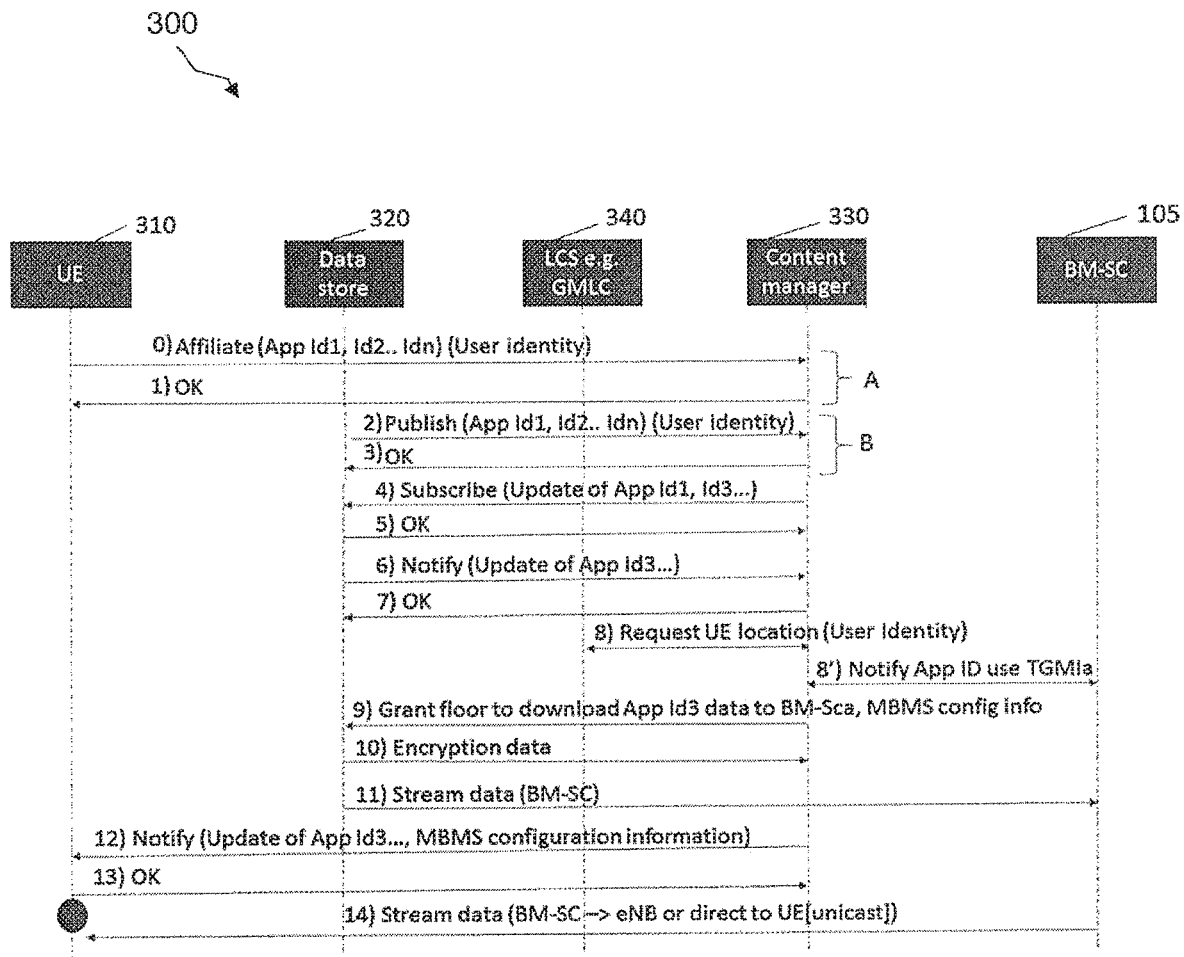
FIG. 3 is an example flow diagram for providing data updates according to an embodiment of the disclosure.

The steps associated with one embodiment of the foregoing concept are pictorially represented in the flow diagram 300 of FIG. 3. The flow diagram 300 may commence via one of two different operations represented as A and B. Operation A comprises steps 0 and 1, while operation B comprises steps 2 and 3. However, operations A and B are independent of one another, and therefore, the flow diagram 300 may begin with steps 2 and 3 rather than steps 0 and 1. For discussion purposes, the flow diagram 300 will be discussed beginning with operation A.

At step 0, a UE 310 may send an affiliation message expressing interest in certain data to a Content Manager 330, which may be implemented by the Content Provider 110 depicted in FIG. 1. While only one UE 310 is depicted in FIG. 3, it is to be understood that the UE 310 is intended to represent a plurality of different UEs (e.g., UE 150A or UE 150B) capable of performing similar functions as the UE 310. The UE 310 may be configured with data (e.g., applications) and may send an affiliation message to the Content Manager 330 to request information related to such applications.

As a non-limiting example, the affiliation message may request to receive updates for applications installed on the UE 310, or to receive notifications when such updates become available for delivery to the UE 310. As another non-limiting example, the affiliation message may inform the Content Manager 330 that the UE 310 is interested in receiving a particular data file, such as, but not limited to, one or more pictures (e.g., JPEG) files, videos, documents, spreadsheets, presentations, applications installed on the UE 310, etc. As used herein, this particular data file may also be known as application data.

In some aspects, the affiliation message may specify delivery time(s) and/or location(s) at which the UE 310 prefers receiving certain types of data, e.g., after business hours and/or when the UE 310 is in a specific location (garage, parks at the supermarket, at the dealership, etc.) where location(s) can be specified via GPS coordinates, CellID, Location/Routing area ID, waypoint, address (e.g. 123 Main Street), etc. For example, the UE 310 may specify that it prefers receiving certain data (e.g., application updates) as soon as possible or during a particular timeframe (e.g., hours in which the user of the UE 310 is typically sleeping). At step 1, the Content Manager 330 may send the UE 310 an OK message acknowledging receipt of the affiliation message.

In an embodiment, the affiliation message sent at step 0 may comprise a SIP message such as a SIP Register or Publish message. FIG. 4 depicts one possible example of the affiliation message implemented as a SIP Publish message 400. The SIP Publish message 400 corresponds to an implementation specified by 3GPP TS 24.379, with changes proposed herein denoted by underlined text. Among other things, the SIP Publish message 400 comprises data such as at least one application identification ID (App-ID) and at least one device (or user) ID identifying the UE 310 (or user thereof). An App-ID may identify a particular application associated with the UE 310, such as an application (or data related thereto) that the UE 310 would like to receive or an existing application on the UE 310. The App-ID may also specify characteristics regarding the identified application, e.g., file size, version information, etc.

In some aspects, the data may be structured such that for any App-ID, one device (or user) ID or many device (or user) IDs may be associated with that App-ID. For example, multiple user identities may exist if the UE 310 is capable of supporting multiple user profiles. One or more such user identities may include at least one different Public User ID than associated with an identity used to access a network. Additionally or alternatively, one or more such user identities may include a Group ID and/or a Default ID. For example, a Group-ID may be used to indicate that users (e.g., group members) within a particular group are interested in data associated with an App-ID for that group. A Default-ID may be used to identify any Public User identity interested in data associated with an App-ID.

Turning again to FIG. 3, at step 2 a Data Store 320 may send a message informing the Content Manager 330 that at least one device (or user thereof) such as the UE 310 has registered an interest in receiving certain data associated with one or more applications. The message in step 2 may comprise a Publish message such as the SIP Publish message 400 depicted in FIG. 4, except entity-specific content such as an origination address (e.g., From, Contact, etc.) may be replaced with content specific to the Data Store 320.

The Publish message may comprise N number of App-IDs corresponding to certain applications and N number of device (or user) IDs corresponding to each UE 310 (N is any positive integer equal to or greater than one). Like the affiliation message in step 0, data in the Publish message may be structured such that for any given App-ID, one user identity or multiple user identities may be associated with that App-ID. Moreover, one or more such user identities may comprise Group-IDs and/or Default-IDs.

The Content Manager 330 may be configured to store the data received in the Publish message from the Data Store 320. The Content Manager 330 may also be configured to determine whether any particular device (or user) ID received in the Publish message is a Group ID or a Default ID. For example, the Content Manager 330 may make this determination by examining information provisioned within the Content Manager 330 or by accessing an external database (or a group manager having access thereto) capable of providing the identities within a particular group. If a particular device (or user) ID received in the Publish message matches an ID provisioned in the Content Manager 330 or provided by the external database, the Content Manager 330 may ascertain that the particular device (or user) ID is a Group ID or a Default ID.

At step 3, the Content Manager 330 may send the Data Store 320 an OK message acknowledging receipt of the Publish message sent in step 2. At step 4, the Content Manager 330 may decide to request notifications from the Data Store 320. As previously mentioned, steps 0 and 1 are independent of steps 2 and 3. Therefore, step 4 may occur after step 0, after step 2, or after both steps 0 and 2. According to one implementation, step 4 may take place after the Content Manager 330 has received a predetermined number of messages in step 0 and/or step 2. The message sent to the Data Store 320 at step 4 may comprise a SIP Subscribe message comprising at least one App-ID and/or at least one status element associated with the at least one App-ID.

The at least one status element may specify whether or not the Data Store 320 is requested to send the Content Manager 330 notifications (or certain types of notifications) when there is a change in the status of application data associated with the at least one App-ID. For example, one status element may request that the Data Store 320 send the Content Manager 330 notifications when application data for applications associated with App-IDs listed in the Subscribe message are updated, while another status element may request the Data Store 320 to send notifications only when the updated application data are ready for transmission to the intended recipient(s). In some cases, a status element may indicate that the Data Store 320 is not required to send the Content Manager 330 any notifications associated with an App-ID listed in the Subscribe message. In such cases, the notification(s) associated with the App-ID may be deleted.

At step 5, the Data Store 320 may send the Content Manager 330 an OK message acknowledging receipt of the Subscribe message. For each App-ID listed in the Subscribe message, the Data Store 320 may record the type of notification based on the status element associated with that App-ID. If a notification for a particular App-ID has previously been requested by the Content Manager 330, the Data Store 320 shall update the notification if a status element in the received Subscribe message indicates that the Content Manager 330 is requesting a different type of notification for that particular App-ID. In cases where a status element indicates that notifications for a particular App-ID is not required, the Data Store 320 shall delete the notification for that particular App-ID.

After sending the OK message in step 5, the Data Store 320 may monitor application data associated with each App-ID for which the Content Manager 330 has requested notifications. Application data may be populated in storage (e.g., a database, data structure, storage, memory, or the like) within the Data Store 320. Additionally or alternatively, application data may be populated in a remote database (not shown) accessible to the Data Store 320. At step 6, the Data Store 320 may send the Content Manager 330 a notification upon detecting a status change in application data associated with one or more App-IDs. The notification in step 6 may comprise a SIP Notify message comprising one or more App-IDs and status change(s) associated with the one or more App-IDs (e.g., an indication that application data associated with an App-ID has been updated or deleted). At step 7, the Content Manager 330 may send the Data Store 320 an OK message acknowledging receipt of the Notify message.

Upon learning of the status change(s) associated with the one or more App-IDs listed in the SIP Notify message from step 6, the Content Manager 330 may proceed to determine a location of each UE 310 that expressed an interest in receiving application data associated with the one or more listed App-IDs (e.g., user/device IDs provided in the Publish message at step 0, the Affiliation message at step 2, and/or the Subscribe message at step 4). For example, if the status change(s) associated with the one or more App-IDs is/are not time-sensitive, it might be more efficient to broadcast the corresponding application data to each UE 310 using a broadcast technology e.g., MBMS rather than delivering that data using a P2P mechanism. Thus, the Content Manager 330 may first need to locate each UE 310 so that updated application data may be broadcasted when a sufficient number of UEs are within a certain geographical area at a certain time.

To this end, the Content Manager 330 may send a Request message to at least one LCS entity 340 at step 8. The LCS entity 340 may comprise any suitable entity configured to provide location information such as, but not limited to, a GMLC. At step 8, the Content Manager 330 may communicate with the LCS entity 340 to exchange location information of each UE 310 corresponding to the device (or user) IDs provided in step 0, step 2, and/or step 4. As previously discussed, the Content Manager 330 may possess or obtain all identities within a particular group. Thus, in situations where a Group ID was provided in step(s) 0, 2, and/or 4, the Content Manager 330 may utilize all Public User IDs within that group to request location information for those identities from, e.g., the LCS entity 340. The Content Manager 330 may request such location information as described herein using any suitable procedures such as, but not limited to, those defined by 3GPP TS 23.271, 3GPP TS 24.379, Internet Key Exchange Protocol Version 2 (IKEv2), OMA Secure User Plane Location (OMA SUPL), etc.

In some cases, location information may comprise Cell IDs corresponding to certain geographic areas, where the Cell IDs may then be mapped into MBMS service area identities. Additionally or alternatively, the Content Manager 330 may request location information from a SCEF. The SCEF (not shown) may comprise or be connected to the LCS entity 340; or the SCEF may be a separate entity configured to monitor and provide the Content Manager 330 with notifications of certain events regarding one or more UEs 310. If location information is sought for a UE 310 that is not connected to a network, the Content Manager 330 may request that the location information be provided when the presence of that UE 310 becomes available. Additionally or alternatively, the Content Manager 330 may request to be informed when that UE 310 is detected in one or more specific locations.

According to one implementation, the Data Store 320 and/or the Content Manager 330 may request the media data that is associated with an App-ID data to be sent over a unique identifier (e.g., TMGI or Flow ID). In this implementation, the Content Manager 330 may optionally send a broadcast entity such as the BM-SC 105 a Notification message using a TMGI in step 8'. Sending the Notification message in step 8' may trigger an Activate MBMS Bearer procedure 500 between the Content Manager 330 and the BM-SC 105, such as shown in FIG. 5. The Activate MBMS Bearer procedure 500 corresponds to an implementation specified by 3GPP TS 23.468, with changes proposed herein denoted by strikethroughs and underlined text.

At step 9, the Content Manager 330 may send the Data Store 320 a notification such as, but not limited to, a SIP INFO message, a SIP message, a SIP Publish message, a Diameter message, or the like. The notification message sent at step 9 may include (i) one or more App-IDs for which the Data Store 320 may send updated application data; and (ii) MBMS configuration information such as, but not limited to, an IP address of the BM-SC 105, a port number associated with the IP address, security mechanism (e.g., DTLS or IKE/IPSec), etc.

At step 10, the Data Store 320 may send the Content Manager 330 a message comprising encryption data. The encryption data may include any of the following: (i) an encryption algorithm to be used to decipher a data stream (e.g., updated application data); (ii) an encryption key to be used to decipher the data stream; and/or (iii) App-ID(s)—the App-ID identifies to the Content Manager 330 which App-IDs will use the specific TMGI/Flow ID that was included in step 9 of the flow diagram 300. If the Content Manager 330 determines that the App-IDs received in the message at step 10 do not match all App-IDs sent in the notification at step 9, the Content Manager 330 may repeat steps 8/8' and 9.

At step 11, the Data Store 320 may send/stream application data to the BM-SC 105 using the IP address and the port number received in the notification from the Content Manager 330 at step 9. The Data Store 320 may also use the security mechanism received in the notification at step 9. Pursuant to 3GPP standards, the BM-SC 105 may be configured to stream application data received from the Data Store 320 on the MBMS bearer associated with the IP address and port number.

In an embodiment, steps 9, 10, and 11 may be combined into a single step or two steps. For example, rather than the Data Store 320 sending encryption data and application data to the Content Manager 330 and the BM-SC 105 at steps 10 and 11 (respectively), the Data Store 320 may send that encryption and application data to the Content Manager 330, which may then stream the data.

At step 12, the Content Manager 330 may send a notification to each UE 310 that has expressed an interest in receiving application data to be streamed by the BM-SC 105. The notification may comprise, e.g., a SIP Notify message comprising any of the following: (i) MBMS information (e.g., service description, TMGI, Flow ID(s), etc.); (ii) the encryption algorithm to be used to decipher the data stream; (iii) the encryption key to be used to decipher the data stream; (iv) App-ID(s) to be found on the Flow ID(s); and/or instructions for receiving the data stream. FIG. 6 depicts a possible implementation of an MBMS bearer announcement procedure 600 that the Content Manager 330 may use to send the notification to each UE 310 at step 12. The MBMS bearer announcement procedure 600 corresponds to an implementation specified by 3GPP TS 24.379, with changes proposed herein denoted by strikethroughs and underlined text.

In an alternative implementation, the Content Manager 330 may send each UE 310 a message including a URL at step 12. Each UE 310 may use the URL to retrieve data referenced by the URL (e.g., using a HTTP GET request method). The URL may point to a particular network entity such as an external database, e.g., Network Node 3 (not shown in FIG. 3), which comprises substantially the same information comprised in the notification described above with respect to step 12. At step 13, each UE 310 may optionally send the Content Manager 330 an OK message acknowledging receipt of the notification or URL sent in step 12. In some scenarios, for example, there may be a relatively large number of UEs 310 subscribing to content associated with the application data to be received. As such, uplink radio resources in a particular geographic area (e.g., a cell where the UEs 310 are located) may be substantially depleted if each UE 310 were to send an OK message at step 13. In such scenarios, the Content Manager 330 may specify that the OK message is optional or not necessary, thereby preserving uplink radio resources for other purposes (e.g., applications or services of higher priority).

At step 14, the BM-SC 105 may send/stream the application data received at step 11 over the appropriate MBMS bearer to the UE 310. The BM-SC 105 may be configured to determine whether to send/stream application data to UEs 310 over unicast connections, broadcast/multicast connections, or a combination thereof. To receive application data from the BM-SC 105 at step 14, each UE 310 shall (i) listen to the general purpose MBMS subchannel defined in the "m=application" media line in the "application/sdp" MIME body (specified at paragraph 7 of the procedure 600 in FIG. 6) in the received SIP MESSAGE request when entering an MBMS service area where the announced MBMS bearer is available; and (ii) download the data and decrypt it, if it received the encryption algorithm and or encryption key in the respective <encryption-algorithm> and <encryption-key> elements specified at paragraphs 8(g) and 8(h) of the MBMS bearer announcement procedure 600. The UE shall then update the data for the respective App-IDs that were identified in the <app-id> element at paragraph 8(i) of the MBMS bearer announcement procedure 600.

In some implementations, application data to be streamed by the BM-SC 105 may comprise software downloads intended for vehicles (e.g., an EMU update for certain types of cars). In such implementations, it might be desirable to have the software downloaded while the vehicles are stationary. Thus, the Content Manager 330 may coordinate with the UE 310 or LCS (location services) in each vehicle to ensure that software downloads occur while those vehicles are parked. Additionally or alternatively, the Content Manager 330 may be configured to schedule software downloads to vehicles based on a release date, release data and/or a number of vehicles available to receive the software downloads.

For example, a vehicle manufacturer may specify that vehicles should download a new software within a certain timeframe such as 12 weeks after releasing the new software. During the initial stages such as week 1, the Content Manager 330 may delay scheduling broadcasts of the new software to vehicles until a sufficient number of vehicles are available (e.g., only when 10 vehicles are gathered in a certain geographical area). During the later stages such as week 10, the Content Manager 330 may schedule broadcasts of the new software to vehicles when there are less vehicles (e.g., even if only 5 vehicles are gathered together). In the final stages such as week 12, the Content Manager 330 may schedule broadcasts to any number of vehicles as well as schedule unicast downloads to individual vehicles.

In some scenarios, it might be desirable for the Content Manager 330 to schedule MBMS broadcasts of time-sensitive content (e.g., MC service data). For instance, assume the UE 310 is part of a group of users such as firemen, and the Data Store 320 informs the Content Manager 330 at step 6 that there is updated application data (e.g., a file describing a location of a fire incident) associated with a Group ID corresponding to the firemen. In this scenario, the Content Manager 330 may coordinate with the Data Store 320, LCS entity 340, and BM-SC 105 to ensure that the firemen receive the updated application data as soon as possible. Ideally, the updated application data would be broadcasted to the UE 310 of each fireman at substantially the same time. However, a few of those UEs 310 might be located in an area where the updated application data cannot be broadcasted using MBMS. In such cases, the Content Manager 330 may schedule delivery of the updated application data to those UEs 310 via unicast, while scheduling a broadcast of the updated application data to as many other UEs 310 as possible (i.e., such that these UEs simultaneously receive the updated application data over a common MBMS channel).

Figure 7:
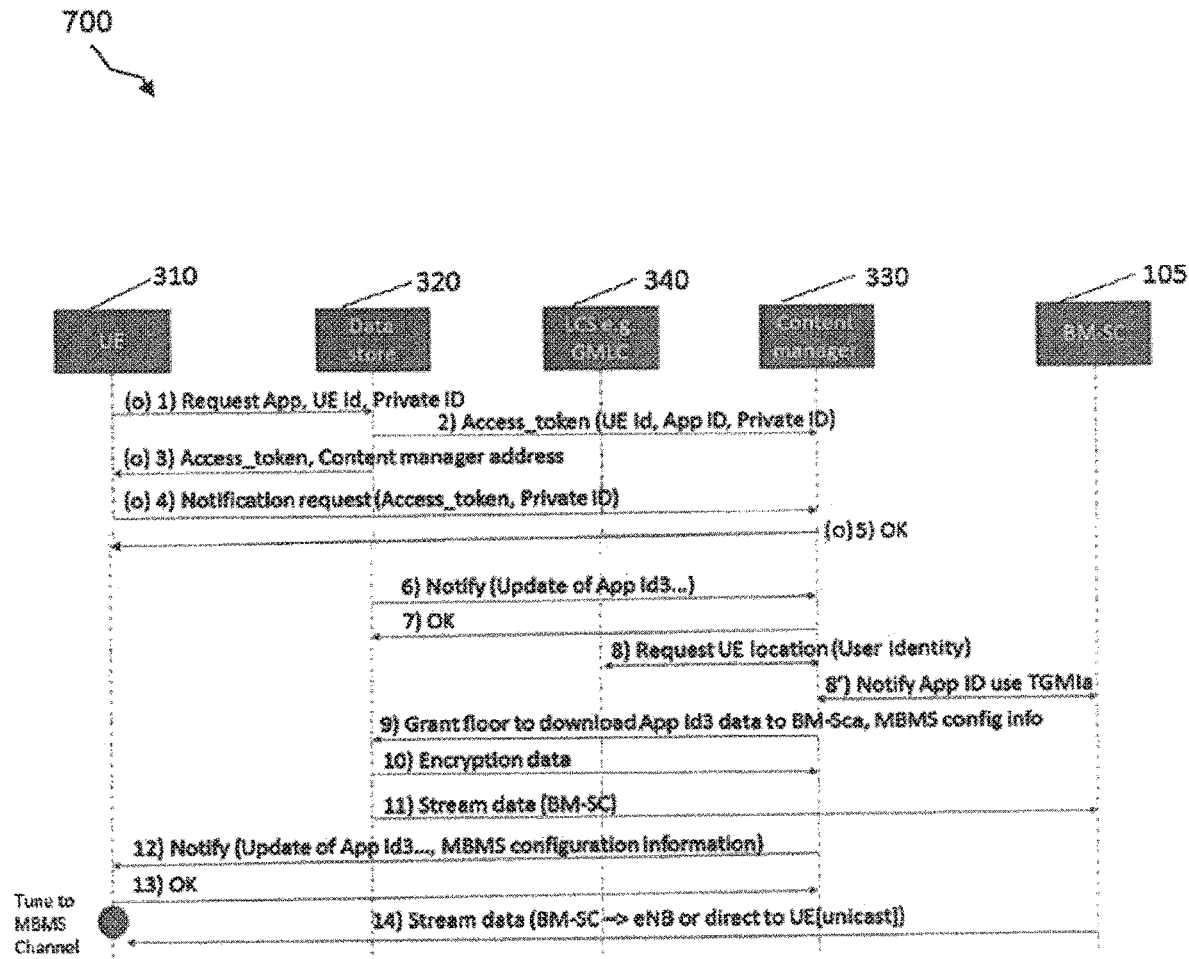
FIG. 7 is an example flow diagram for providing data updates according to an embodiment of the disclosure.

FIG. 7 depicts a flow diagram 700 for delivering application data according to another embodiment of the present disclosure. In FIG. 7, label "(o)" denotes steps that may be optional according to various aspects of the flow diagram 700. At step 1, a UE 310 may send a message to a Data Store 320 requesting certain data. Like FIG. 3, although only one UE 310 is depicted in FIG. 7, it is to be understood that the UE 310 may represent a plurality of different UEs. The message sent at step 1 may comprise at least one device (or user) ID identifying the UE 310 (or user thereof) and at least one application ID (App-ID) associated with the at least one user ID. The at least one user ID may include, but is not limited to, a Device ID, Private User ID, Public User ID, etc. The at least one App-ID may include, but is not limited to, a URL, URI, fully qualified domain name (FQDN), PIN, etc.

In some aspects, the at least one App-ID may identify the data requested by the UE 310. As a non-limiting example, the App-ID may identify an application that the UE 310 would like to download. As another non-limiting example, the App-ID may identify data related to data already stored on the UE 310 e.g., a firmware upgrade or an update to an application on the UE 310. In one implementation, the Data Store 320 may have access to a database (not shown) comprising a mapping of device (or user) identifiers to App-IDs. According to this implementation, step 1 may be optional as the Data Store 320 may discern what data the UE 310 should download based on the database. For example, if new software such as an update to an existing application on the UE 310 becomes available, the Data Store 320 would know that data needs to be downloaded.

Upon receiving the message sent from the UE 310 at step 1, the Data Store 320 may send a message to a Content Manager 330 at step 2. In some implementations, the Content Manager 330 may be integrated with the Content Provider 110 from FIG. 1. The message to the Content Manager 330 may comprise the content conveyed in the message from the UE 310 at step 1, as well the data requested by the UE 310. In some aspects, the message to the Content Manager 330 may comprise an access token comprising any one or more (e.g., combination) of the following: (i) Device Id; (ii); Private User ID; and/or (iii) App-ID. One non-limiting example of such an access token is a JSON Web Token (JWT), which the Internet Engineering Task Force (IETF) defines in RFC 7519 as a string representing a set of claims as a JSON object that is encoded in a JSON Web Signature (JWS) or JSON Web Encryption (JWE), enabling the claims to be digitally signed, authenticated, and/or encrypted.

At step 3, the Data Store 320 may optionally send the UE 310 a message including the access token from step 2 and an address of the Content Manager 330, e.g., an IP address, URL, FQDN, etc. At step 4, the UE 310 may optionally send the Content Manager 330 a notification request comprising the access token received in step 3. The notification request may also comprise a Private ID sent in the message at step 1. If no Private ID was sent in step 1 or if the Data Store 320 does not have access to a stored Private ID, that Private ID may be included in the notification request sent to the Content Manager 330 in step 4. In some implementations, the notification request may include numerous Private IDs such as a Private ID applicable to the Data Store 320 and at least another Private ID applicable to an access network that the UE 310 is currently using (e.g., cellular network). Upon receiving the notification request from the UE 310, the Content Manager 330 may validate the access token received at step 4 against the access token received at step 2.

At step 5, the Content Manager 330 may optionally send the UE 310 an OK message acknowledging receipt of the notification request. Steps 6 to 14 are substantially the same as steps 6 to 14 in FIG. 3. Therefore, the prior discussion of steps 6 to 14 in FIG. 3 is similarly applicable to steps 6 to 14 of FIG. 7 and not repeated here for brevity.

Figure 8:
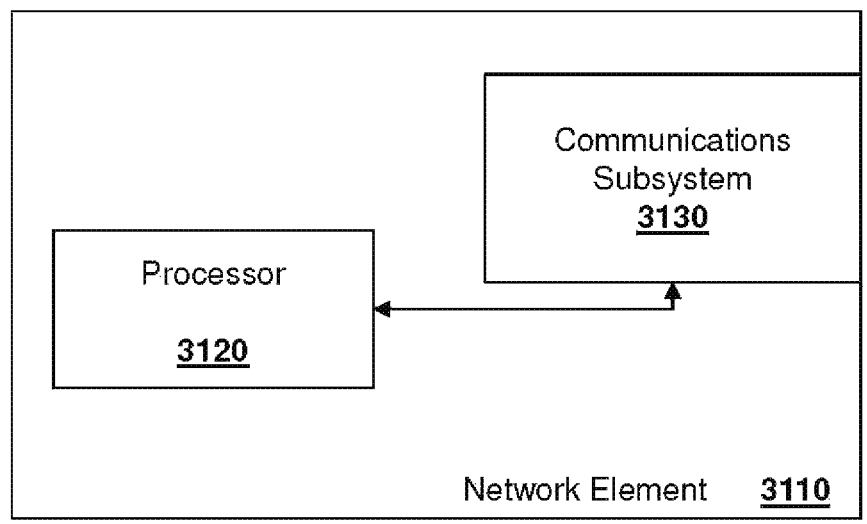
FIG. 8 is an example block diagram of a network element according to one embodiment.

The various methods or operations described herein may be implemented by a network element. An example network element is shown with regard to FIG. 8. In FIG. 8, network element 3110 includes a processor 3120 and a communications subsystem 3130, where the processor 3120 and communications subsystem 3130 cooperate to perform the methods or operations previously described.

Figure 9:
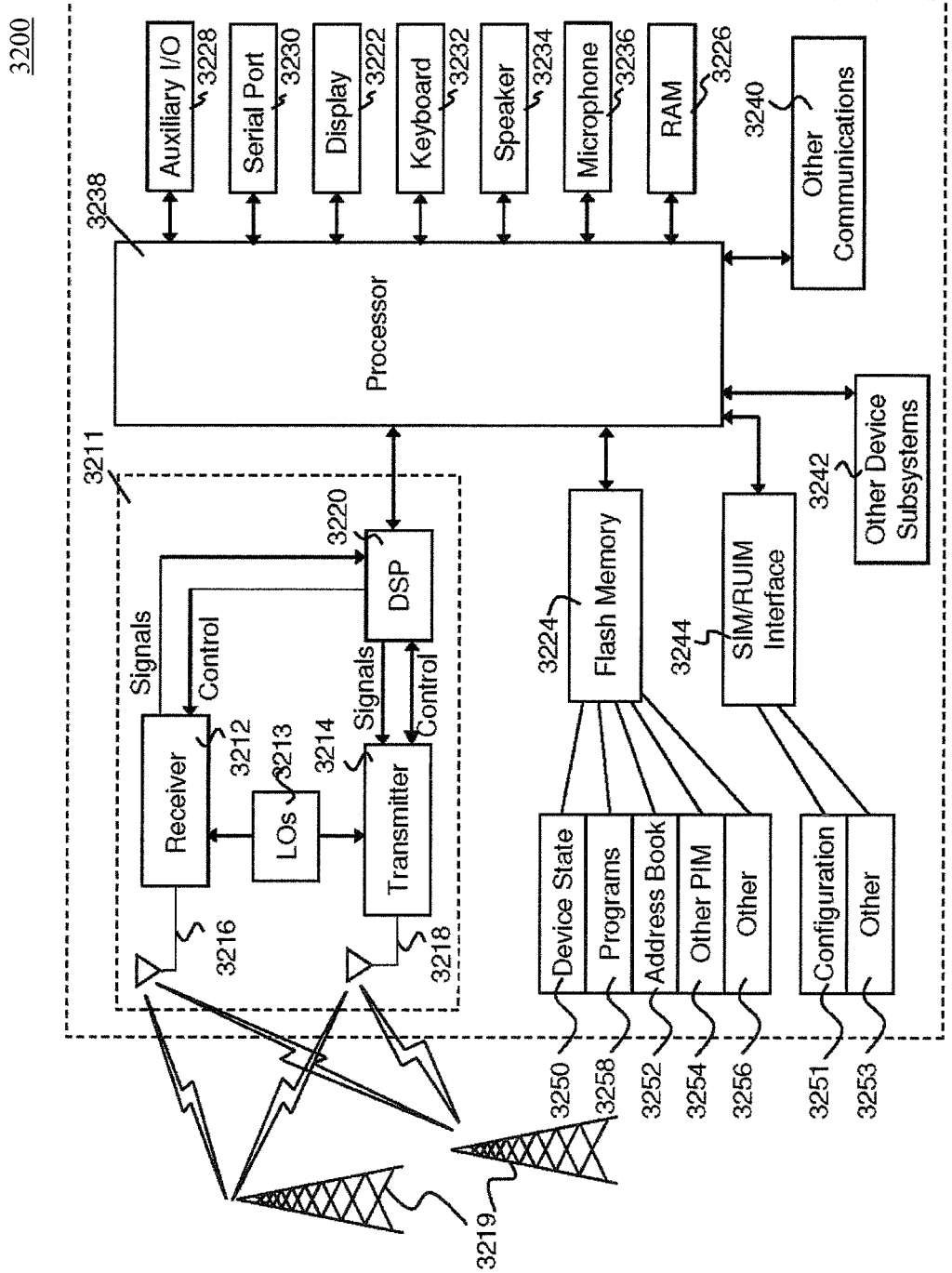
FIG. 9 is a block diagram with an example user equipment capable of being used with the systems and methods in the embodiments described herein.

Further, the various methods or operations described herein may be implemented by a communications device (e.g., UE 310, Data Store 320, Content Manager 330, LCS entity 340, BM-SC 105, etc.). An example of a communications device is described below with regard to FIG. 9. The communications device 3200 may comprise a two-way wireless communication device having voice and data communication capabilities. In some embodiments, voice communication capabilities are optional. The communications device 3200 generally has the capability to communicate with other computer systems on the Internet. Depending on the exact functionality provided, the communications device 3200 may be referred to as a data messaging device, a two-way pager, a wireless e-mail device, a cellular telephone with data messaging capabilities, a wireless Internet appliance, a wireless device, a smart phone, a mobile device, or a data communication device, as examples.

Where the communications device 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. The particular design of the communication subsystem 3211 may be dependent upon the communication network 3219 in which the communications device 3200 is intended to operate.

Network access may also vary depending upon the type of network 3219. In some networks, network access is associated with a subscriber or user of the communications device 3200. The communications device 3200 may use a RUIM or a SIM card in order to operate on a network. The SIM/RUIM interface 3244 is typically similar to a card slot into which a SIM/RUIM card may be inserted. The SIM/RUIM card may have memory and may hold many key configurations 3251 and other information 3253, such as identification and subscriber-related information.

When network registration or activation procedures have been completed, the communications device 3200 may send and receive communication signals over the network 3219. As illustrated, the network 3219 may comprise multiple base stations communicating with the communications device 3200.

Signals received by antenna 3216 through communication network 3219 are input to receiver 3212, which may perform such common receiver functions as signal amplification, frequency down conversion, filtering, channel selection, and the like. Analog to digital (A/D) conversion of a received signal allows more complex communication functions, such as demodulation and decoding to be performed in the DSP 3220. In a similar manner, signals to be transmitted are processed, including modulation and encoding for example, by DSP 3220 and are input to transmitter 3214 for digital to analog (D/A) conversion, frequency up conversion, filtering, amplification, and transmission over the communication network 3219 via antenna 3218. DSP 3220 not only processes communication signals but also provides for receiver and transmitter control. For example, the gains applied to communication signals in receiver 3212 and transmitter 3214 may be adaptively controlled through automatic gain control algorithms implemented in DSP 3220.

The communications device 3200 generally includes a processor 3238 which controls the overall operation of the device. Communication functions, including data and voice communications, are performed through communication subsystem 3211 in cooperation with the processor 3238. Processor 3238 also interacts with further device subsystems such as the display 3222, flash memory 3224, random access memory (RAM) 3226, auxiliary input/output (I/O) subsystems 3228, serial port 3230, one or more user interfaces such as keyboards or keypads 3232, speaker 3234, microphone 3236, one or more other communication subsystems 3240 such as a short-range communications subsystem, and any other device subsystems generally designated as 3242. While the other communication subsystems 3240 and device subsystems 3242 are depicted as separate components in FIG. 9, it is to be understood that subsystems 3240 and device subsystems 3242 (or parts thereof) may be integrated as a single component. Serial port 3230 may include a USB port or other port currently known or developed in the future.

Some of the illustrated subsystems perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions, such as a calculator or task list.

Operating system software used by the processor 3238 may be stored in a persistent store such as flash memory 3224, which may instead be a read-only memory (ROM) or similar storage element (not shown). The operating system, specific device applications, or parts thereof, may be temporarily loaded into a volatile memory such as RAM 3226. Received communication signals may also be stored in RAM 3226.

As shown, flash memory 3224 may be constituted by different areas for both computer programs 3258 and program data storage 3250, 3252, 3254, and 3256. These different storage types indicate that each program may allocate a portion of flash memory 3224 for their own data storage use. Processor 3238, in addition to its operating system functions, may enable execution of software applications on the communications device 3200. A predetermined set of applications that control basic operations, including at least data and voice communication applications for example, may typically be installed on the communications device 3200 during manufacturing. Other applications may be installed subsequently or dynamically.

Applications and software may be stored on any computer-readable storage medium. The computer-readable storage medium may be tangible or in a transitory/non-transitory medium such as optical (e.g., CD, DVD, etc.), magnetic (e.g., tape), or other memory currently known or developed in the future.

One software application may be a personal information manager (PIM) application having the ability to organize and manage data items relating to the user of the communications device 3200 such as, but not limited to, e-mail, calendar events, voice mails, appointments, and task items. One or more memory stores may be available on the communications device 3200 to facilitate storage of PIM data items. Such a PIM application may have the ability to send and receive data items via the wireless network 3219. Further applications may also be loaded onto the communications device 3200 through the network 3219, an auxiliary I/O subsystem 3228, serial port 3230, short-range communications subsystem(s) 3240, or any other suitable subsystem(s) 3242, and installed by a user in the RAM 3226 or a non-volatile store (not shown) for execution by the processor 3238. Such flexibility in application installation may increase the functionality of the communications device 3200 and may provide enhanced on-device functions, communication-related functions, or both. For example, secure communication applications may enable electronic commerce functions and other such financial transactions to be performed using the communications device 3200.

In a data communication mode, a received signal such as a text message or web page download may be processed by the communication subsystem 3211 and input to the processor 3238, which may further process the received signal for output to the display 3222, or alternatively to an auxiliary I/O device 3228.

A user of the communications device 3200 may also compose data items, such as email messages for example, using the keyboard 3232, which may be a physical or on-screen/virtual complete alphanumeric keyboard or telephone-type keypad, among others, in conjunction with the display 3222 and possibly an auxiliary I/O device 3228. Such composed items may then be transmitted over a communication network 3219 through the communication subsystem 3211.

For voice communications, overall operation of the communications device 3200 is similar, except that received signals may typically be output to a speaker 3234 and signals for transmission may be generated by a microphone 3236. Alternative voice or audio I/O subsystems, such as a voice message recording subsystem, may also be implemented on the communications device 3200. Although voice or audio signal output may be accomplished primarily through the speaker 3234, display 3222 may also be used to provide an indication of the identity of a calling party, the duration of a voice call, or other voice call-related information, for example.

Serial port 3230 may be implemented in a personal digital assistant (PDA)-type device for which synchronization with a user's desktop computer (not shown) may be desirable, but such a port is an optional device component. Such a port 3230 may enable a user to set preferences through an external device or software application and may extend the capabilities of the communications device 3200 by providing for information or software downloads to the communications device 3200 other than through a wireless communication network 3219. The alternate download path may, for example, be used to load an encryption key onto the communications device 3200 through a direct and thus reliable and trusted connection to thereby enable secure device communication. Serial port 3230 may further be used to connect the device to a computer to act as a modem.

Other communications subsystems 3240, such as a short-range communications subsystem, are further optional components which may provide for communication between the communications device 3200 and different systems or devices, which need not necessarily be similar devices. For example, one or more other subsystems 3240 may include an infrared device and associated circuits and components or a Bluetooth™ communication module to provide for communication with similarly enabled systems and devices. Subsystems 3240 may further include non-cellular communications such as WiFi, WiMAX, near field communication (NFC), Bluetooth, ProSe (Proximity Services) (e.g., sidelink, PC5, D2D, etc.) and/or radio frequency identification (RFID). The other communications subsystem(s) 3240 and/or device subsystem(s) 3242 may also be used to communicate with auxiliary devices such as tablet displays, keyboards or projectors.

Figure 10:
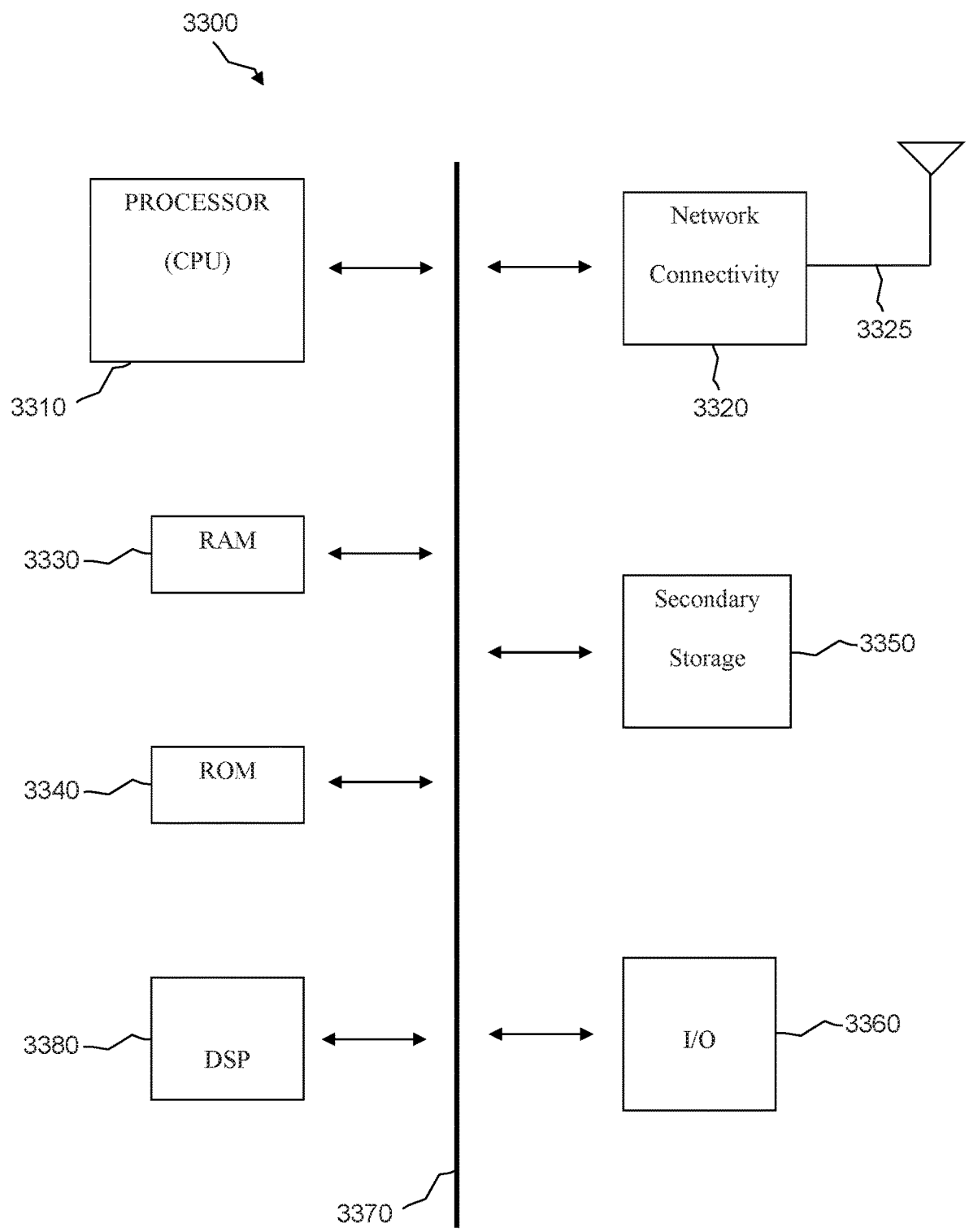
FIG. 10 illustrates an example processor and related components suitable for implementing the several embodiments of the present disclosure.

The communications device 3200 and other components described above might include a processing component that is capable of executing instructions related to the actions described above. FIG. 10 illustrates an example of a system 3300 that includes a processing component 3310 suitable for implementing one or more embodiments disclosed herein. In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips.

The network connectivity devices 3320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, GSM radio transceiver devices, universal mobile telecommunications system (UMTS) radio transceiver devices, LTE radio transceiver devices, new generation radio transceiver devices, worldwide interoperability for microwave access (WiMAX) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 3325 might be considered to be a component of the I/O devices 3360 instead of or in addition to being a component of the network connectivity devices 3320.

The following are incorporated herein by reference for all purposes: 3GPP TS TS 24.379, 3GPP TS 23.271, 3GPP TS 23.468, 3GPP TS 23.179, 3GPP TS 23.379, 3GPP TS 23.280, 3GPP TS 23.281, 3GPP TS 23.282, 3GPP TS 26.346, 3GPP TS 22.280, 3GPP TS 22.281, 3GPP TS 22.179, 3GPP TS 22.282, 3GPP TS 36.300, 3GPP TS 23.246, 3GPP TS 33.220, IETF RFC 5996, IETF RFC 7651, OMA SUPL, OMA-TS-DM_Server Delegation_Protocol-V1_3-20121009-C.

In an embodiment, a method for providing application data is provided. The method includes a network node receiving at least one application identifier (App-ID) associated with at least a first user equipment (UE) and a second UE, and requesting to receive notifications of updates to application data associated with the at least one App-ID. The method also includes the network node configuring a broadcast entity to transmit application data associated with the at least one App-ID, and the network node sending configuration data to the first and second UEs for receiving application data from the broadcast entity.

In another embodiment, a network node is provided. The network node comprises a memory comprising instructions and a processor coupled to the memory. The processor is configured to execute the instructions such that the network node receives at least one application identifier (App-ID) associated with at least a first user equipment (UE) and a second UE; requests to receive notifications of updates to application data associated with the at least one App-ID; configures a broadcast entity to transmit application data associated with the at least one App-ID; and sends the first and second UEs configuration data for receiving application data from the broadcast entity.

In yet another embodiment, a computer-readable medium is provided. The computer-readable medium comprises instructions that, when executed by a processor cause a network node to implement a method. The method includes the network node receiving at least one application identifier (App-ID) associated with at least a first user equipment (UE) and a second UE, and requesting to receive notifications of updates to application data associated with the at least one App-ID. The method also includes the network node configuring a broadcast entity to transmit application data associated with the at least one App-ID, and the network node sending configuration data to the first and second UEs for receiving application data from the broadcast entity.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for receiving application data, the method comprising:
    sending, by a first user equipment (UE), a first Session Initiation Protocol (SIP) message to a network node, the first SIP message comprising an application identifier (App-ID) and a user ID associated with the App-ID, wherein the App-ID identifies an application in which the first UE and a second UE are both interested, wherein the user ID identifies at least one of the first UE or the second UE; and
    receiving, at the first UE, configuration data from the network node for receiving updated application data from a broadcast entity, wherein the updated application data is associated with the App-ID.

2. The method of claim 1, further comprising the first UE receiving the updated application data from the broadcast entity when the first and second UEs are within a predefined geographical area.

3. The method of claim 2, wherein the broadcast entity comprises a Broadcast-Multicast Service Center (BM-SC).

4. The method of claim 3, wherein the configuration data comprise Multimedia Broadcast Multicast Service (MBMS) information comprising an Internet Protocol (IP) address of the BM-SC and a port number associated with the IP address.

5. The method of claim 4, wherein the first UE is configured to use the IP address and the port number to receive the updated application data over an MBMS channel at a same or substantially same time as the second UE.

6. The method of claim 4, wherein the MBMS information further comprises encryption data to be used by the first UE to decipher the updated application data transmitted by the BM-SC.

7. The method of claim 2, wherein the network node comprises a content manager, a mission critical (MC) push-to-talk (MCPTT) server, a group communication service (GCS) server, an MCData Server, an MCVideo server, a location management server, or any combination thereof.

8. A user equipment (UE) comprising:
a memory comprising instructions; and
a processor coupled to the memory and configured to execute the instructions to cause the UE to:
send a first Session Initiation Protocol (SIP) message to a network node, the first SIP message comprising an application identifier (App-ID) and a user ID associated with the App-ID, wherein the App-ID identifies an application in which the UE and a second UE are both interested, wherein the user ID identifies at least one of the UE or the second UE; and
receive, from the network node, configuration data for receiving updated application data from a broadcast entity, wherein the updated application data is associated with the App-ID.

9. The UE of claim 8, wherein the UE is configured to receive the updated application data from the broadcast entity when the UE and second UE are within a predefined geographical area.

10. The UE of claim 9, wherein the broadcast entity comprises a Broadcast-Multicast Service Center (BM-SC), and wherein the network node comprises a content manager, a Mission critical push-to-talk (MCPTT) server, a Group Communication Service (GCS) server, an MCData server, an MCVideo server, a location management server, or any combination thereof.

11. The UE of claim 10, wherein the configuration data comprise Multimedia Broadcast Multicast Service (MBMS) information comprising an Internet Protocol (IP) address of the BM-SC and a port number associated with the IP address.

12. The UE of claim 11, wherein the UE is configured to use the IP address and the port number to receive the updated application data over an MBMS channel at a same or substantially same time as the second UE.

13. The UE of claim 11, wherein the MBMS information further comprise encryption data to be used by the UE to decipher the updated application data transmitted by the BM-SC.

14. A non-transitory computer-readable medium comprising instructions executable by a processor such that when executed, cause the processor to implement a method on a user equipment (UE), the method comprising:
sending, by the UE, a first Session Initiation Protocol (SIP) message to a network node, the first SIP message comprising an application identifier (App-ID) and a user ID associated with the App-ID, wherein the App-ID identifies an application in which the UE and a second UE are both interested, wherein the user ID identifies at least one of the UE or the second UE; and
receiving, from the network node, configuration data for receiving updated application data from a broadcast entity, wherein the updated application data is associated with the App-ID.

15. The non-transitory computer-readable medium of claim 14, the method further comprising the UE receiving the updated application data from the broadcast entity when the UE and second UE are within a predefined geographical area.

16. The non-transitory computer-readable medium of claim 15, wherein the broadcast entity comprises a Broadcast-Multicast Service Center (BM-SC).

17. The non-transitory computer-readable medium of claim 16, wherein the configuration data comprise Multimedia Broadcast Multicast Service (MBMS) information comprising an Internet Protocol (IP) address of the BM-SC and a port number associated with the IP address.

18. The non-transitory computer-readable medium of claim 17, wherein the UE is configured to use the IP address and the port number to receive the updated application data over an MBMS channel at a same or substantially same time as the second UE.

19. The non-transitory computer-readable medium of claim 17, wherein the MBMS information further comprise encryption data to be used by the UE to decipher the updated application data transmitted by the BM-SC.

20. The non-transitory computer-readable medium of claim 15, wherein the network node comprises a content manager, a mission critical push-to-talk (MCPTT) server, a group communication service (GCS) server, an MCData Server, an MCVideo server, a location management server, or any combination thereof.

\* \* \* \* \*